United States Patent
Kuo et al.

(10) Patent No.: US 8,648,004 B2
(45) Date of Patent: Feb. 11, 2014

(54) METHODS OF PREPARING CARBINIZED NANOTUBE COMPOSITE AND METAL-NANOTUBE COMPOSITE CATALYST

(75) Inventors: Ping-Lin Kuo, Tainan (TW); Chun-Han Hsu, Tainan (TW); Wan-Ting Li, Tainan (TW); Hsiu-Mei Wu, Tainan (TW)

(73) Assignee: National Cheng Kung University, Tainan (TW)

( * ) Notice: Subject to any disclaimer, the term of this patent is extended or adjusted under 35 U.S.C. 154(b) by 319 days.

(21) Appl. No.: 13/081,710

(22) Filed: Apr. 7, 2011

(65) Prior Publication Data
US 2012/0258850 A1 Oct. 11, 2012

(51) Int. Cl.
- B01J 21/18 (2006.01)
- B01J 23/00 (2006.01)
- B01J 23/40 (2006.01)
- B01J 23/74 (2006.01)

(52) U.S. Cl.
USPC .......... 502/184; 502/185; 977/742; 977/745; 977/748; 977/753; 977/845; 977/847

(58) Field of Classification Search
USPC .......... 502/184, 185; 977/742, 745, 748, 753, 977/845, 847
See application file for complete search history.

(56) References Cited

U.S. PATENT DOCUMENTS

| | | | |
|---|---|---|---|
| 7,250,569 B2* | 7/2007 | Sun et al. | 136/252 |
| 7,279,247 B2* | 10/2007 | Matarredona et al. | 429/524 |
| 8,193,430 B2* | 6/2012 | Papadimitrakopoulos et al. | 210/749 |
| 8,211,969 B2* | 7/2012 | Zou et al. | 524/496 |
| 2009/0001326 A1* | 1/2009 | Sato et al. | 252/511 |
| 2010/0051471 A1* | 3/2010 | Meng et al. | 205/414 |
| 2010/0104808 A1* | 4/2010 | Fan et al. | 428/143 |

OTHER PUBLICATIONS

"Sea urchin-like mesoporous carbon material grown with carbon nanotubes as a cathod catalyst support for fuel cells," Ping-Lin Kuo et al. Journal of Power Sources 195 (2010), pp. 7983-7990.*

"Surface modifications for the effective dispersion of carbon nanotubes in solvents and polymers," Sang Won Kim et al. Carbon 50 (2012), pp. 3-33.*

"The use of carbon nanotubes coated with a porous nitrogen-doped carbon layer with embedded Pt for the methanol oxidation reaction," Chun-Han Hsu et al. Journal of Power Sources 198 (2012), pp. 83-89.*

"Excellent performance of Pt0 on high nitrogen-containing carbon nanotubes using aniline as nitrogen/carbon source, dispersant and stabilizer," Chun-Han Hsu et al. Chem. Commun., 2010, 46, pp. 7628-7630.*

"Hybrid Composite of Polyaniline Containing Carbon Nanotube," Jian Guo Deng et al. Chinese Chemical Letters, vol. 12, No. 11, 2001, pp. 1037-1040.*

* cited by examiner

Primary Examiner — Patricia L Hailey
(74) Attorney, Agent, or Firm — Merchant & Gould P.C.

(57) ABSTRACT

A method for preparing a metal-nanotube composite catalyst for an electro-chemical oxygen reduction reaction includes: debundling carbon nanotubes (CNTs); loading a carbon-containing polymeric material onto the surfaces of the nanotubes that have been debundled; carbonizing in situ the carbon-containing polymeric material on the carbon nanotubes to form carbon char layers surrounding the surfaces of the carbon nanotubes; and loading metal catalyst particles on the carbon nanotubes. The carbon char layers contain high amount of nitrogen and may be formed into a porous structure.

20 Claims, 10 Drawing Sheets

METHODS OF PREPARING CARBINIZED NANOTUBE COMPOSITE AND METAL-NANOTUBE COMPOSITE CATALYST

BACKGROUND OF THE INVENTION

1. Field of the Invention

The invention relates to a method for preparing a carbonized nanotube composite and a method for preparing a catalyst using the carbonized nanotube composite.

2. Description of the Related Art

Carbon nanotubes (CNTs) are of great interest due to their unique mechanical strength, high electrical conductivity, and excellent chemical stability. However, they exist in the aggregated form and in parallel bundles induced by their strong van der waals and π-π interactions, making this material immiscible with most media, which is crucial to their processing. Numerous attempts have been made to develop an effective method to discretely disperse CNTs.

Strategies have been adopted to attach metal nanoparticles onto the surface of CNTs, such as functionalization of covalent-surface by oxidative treatment to generate carboxylic acid groups on the external walls of CNTs. Such surface functionalization provides a route for metal precursors to correlate with CNTs and prompts the deposition of metal on the external walls. However, approaches such as above are often considered inferior due to a lack of good control of particle size and distribution, as well as damaging the surface and reducing the unique properties such as electronic conductivity. Without surface modification, CNTs lack sufficient binding sites for anchoring precursor metal ions or metal nanoparticles, which usually leads to poor dispersion and aggregation, especially at high loading conditions.

Nitrogen doped carbon nanotubes (N-CNTs) have been studied extensively as substrate materials of catalysts for fuel cells due to their unique structure. N-doping on CNT can affect the properties such as conductivity, nanostructure and catalyst activity.

Pt-based nanoparticles are widely used as a catalyst for application in fuel cells, where they are homogeneously dispersed on various types of carbon supports. Pt supported on N-CNT can exhibit enhanced catalytic activity toward oxygen reduction reaction (ORR). Reported studies have shown that CNTs are superior to carbon blacks as catalyst supporters for proton-exchange membrane fuel cells (PEMFCs) due to their distinctive metal-support interaction, higher electronic conductivity, and good chemical stability. Compared with Pt particles trapped in the pores of a carbon black support, the Pt particles attached on the CNT surface can interact with the reactant more efficiently; but unfortunately, they agglomerate or coagulate with each other more easily. Therefore, it is of paramount importance to develop an effective synthetic method to stabilize $Pt^{4+}$ and $Pt^{(0)}$ to prepare small and well-dispersed nanoparticles on CNTs.

SUMMARY OF THE INVENTION

An object of the invention is to provide a method of preparing a carbonized nanotube composite and a method of preparing a carbonized nanotube composite catalyst that is usable for a chemical reaction.

According to one aspect of the present invention, a method of preparing a carbonized nanotube composite for preparation of a catalyst usable in a chemical reaction, comprises:

debundling carbon nanotubes;
loading a carbon-containing polymeric material onto the surfaces of the nanotubes that have been debundled; and
carbonizing in situ the carbon-containing polymeric material on the carbon nanotubes to form carbon char layers surrounding the surfaces of the carbon nanotubes.

According to another aspect of the present invention, a method of preparing a metal-carbon nanotube composite catalyst for a chemical reaction, comprises:

debundling carbon nanotubes;
loading a carbon-containing polymeric material onto the surfaces of the nanotubes that have been debundled;
carbonizing in situ the carbon-containing polymeric material on the carbon nanotubes to form carbon char layers surrounding the surfaces of the carbon nanotubes; and
loading metal catalyst particles on the carbon nanotubes.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

The present invention is directed to a method of preparing a carbonized nanotube composite having carbon char layers, and a method of preparing a metal-carbon nanotube composite catalyst by loading metal catalyst particles onto well-debundled carbon nanotubes surrounded by the carbon char layers. With the carbon char layers serving as shells for the carbon nanotubes, the carbon nanotubes can have increased surface roughness and surface area, and can be provided a new conductive pathway to enhance conductivity between the sidewalls of the nanotubes. Small nanoparticles of the metal catalyst can be stabilized on the carbon nanotubes with a uniform distribution when the carbon nanotubes are surrounded by the carbon char shells.

In order to effectively debundle the carbon nanotubes, pristine carbon nanotubes may be treated by using aniline as a surface active agent. Aniline contains a hydrophobic ring acting as a leopophile to interact with the conjugated π electrons on the CNT surface and also contains a polar group acting as a hydrophile to interact with the polar medium. Therefore, aniline can be regarded as an amphiphilic molecule that behaves and acts as the simplest surface active agent in the suspension of CNTs in the polar organic solvent.

The carbon nanotubes may also be treated with other polar compounds that can behave as small size amphiphilic molecules, such as aromatic arenic compounds or short chain aliphatic compounds containing amino, hydroxyl, carboxyl, and/or carbonyl amide groups.

Advantageously, by treatment with aniline, which is a physical rather than a chemical process, the method can debundle the carbon nanotubes without damaging their graphene structures. In addition, the carbon nanotubes can be debundled to a particle size of less than 50 nm at a very low concentration of aniline, and can be provided with a relatively large pore volume and a relatively large amount of mesopores compared to pristine carbon nanotubes.

Examples of carbon nanotubes that can be used in the method of the present invention include, but are not limited to, single-walled carbon nanotubes, double-walled carbon nanotubes, multi-walled carbon nanotubes, rope carbon nanotubes, etc.

Aniline can disperse and separate the carbon nanotubes in the presence of an aqueous solution of a polar organic solvent. The polar organic solvent may be any suitable organic solvent that contains a polar group such as amino, hydroxyl, carboxyl or carbonyl group. The polar organic solvent may be mixed with a suitable amount of water depending the type of the solvent.

To form the carbon char layer on the carbon nanotubes, aniline adsorbed onto the surface of the debundled CNTs may be polymerized in situ to form polyaniline, which is then carbonized to form the carbon char layer. Alternatively, the carbon char layer may be formed on the carbon nanotubes by directly coating polyaniline on the carbon nanotubes, followed by in situ carbonization of the polyaniline.

Polymerization and carbonization may be carried out using conventional polymerization and carbonization methods. For example, the polymerization can be conducted in the presence of initiator such as potassium bisulfate at room temperature and carboniation can be carried out at a wide range of 500~900° C.

Because the carbon char layer formed from polyaniline contains nitrogen, the carbon nanotubes, when surrounded by the carbon char layer, are doped with nitrogen, which can provide enhanced catalytic activity toward an oxygen reduction reaction. A relatively high amount of nitrogen may be doped on the carbon nanotubes by the method of the present invention. The content of nitrogen in the carbon char layer may be higher than 12%.

The carbon char layer may also be formed on the carbon nanotubes by treating the dispersed carbon nanotubes with nitrogen-free carbon-containing polymeric materials, such as, furfuryl alcohol resin, phenolic resin, etc.

The metal particles usable in the present invention may include Pt, Pd, Co, Au, Mn, Ni, Fe, Cr, etc. The metal catalyst particles may be loaded on the debundled carbon nanotubes surrounded by the carbon char shells by employing a suitable conventional method. Particularly, the aforesaid carbon nanotubes may be interacted with a solution of a metal catalyst precursor, and the metal catalyst precursor may then be converted into the metal catalyst particles through reduction, followed by heat-treatment for calcination.

The metal catalyst particles may be loaded on the carbon nanotubes after the carbon char layers are formed on the carbon nanotubes, or during in situ polymerization of monomers on the carbon nanotubes to form the carbon char layers.

The carbon char layers may be formed into a porous structure using a blowing agent during in situ polymerization of monomers on the carbon nanotubes. In this case, the metal catalyst particles maybe embedded in the porous structure.

The present invention will now be further described by Examples, but the scope of the present invention is not limited to these Examples.

EXAMPLES

Example I

Debundling/Dispersing CNTs

Examples 1A, 1B and 1C

Aniline-Dispersed NCT 0.05 g of pristine CNTs was mixed with an aqueous solution of aniline and was dispersed by sonication, then a well-dispersed CNT solution was obtained. The amount of aniline in the aqueous solution (10 ml of isopropanol/10 ml of water) was varied to be 0.1, 0.5, 2.0 g in Examples 1A to 1C, respectively so that the aniline concentration in the aqueous solution in Examples 1A to 1C were 0.5%, 2.5% and 10%, respectively. Transmission electron microscopy (TEM) was used to investigate the states of the dispersed CNTs as a function of the aniline concentration.

Example 1d

Benzoic Acid-Dispersed CNT 0.05 g of CNT was mixed with an aqueous solution of benzoic acid and was dispersed by sonication to obtain a well-dispersed CNT solution. The amount of benzoic acid in the aqueous solution was varied to be 0.1, 0.5, 2.0 g.

Example 1e

Phenol-Dispersed CNT 0.05 g of CNT was mixed with an aqueous solution containing a water-EtOH cosolvent (water:EtOH=1:1) and phenol, and was dispersed by sonication to obtain a well-dispersed CNT solution.

Example II

Loading Pt on the Dispersed CNTs

Examples 2A, 2B & 2C

Pt/CNT catalyst was synthesized by mixing the debundled CNT solution of Example 1A and a solution of a platinum precursor ($Pt^{+4}$). Then, the $Pt^{+4}$ solution was reduced by sodium citrate. The resulting slurry was filtered and dried to remove the solvent, and then heat-treated by a 4 hours exposure to $H_2$ flow at 400° C. Pt/CNT catalysts with different Pt contents were produced in Examples 2A to 2C by varying the concentration of the Pt precursor in the solution and were investigated by TEM. The contents of Pt contained in the Pt/CNT composite catalysts of Examples 2A, 2B, 2C obtained by thermogravimetric analysis (TGA) were 14.9%, 29.1% and 49%, respectively.

Example III

Synthesis of Carbon Char layer Surrounding Carbon Nanotubes

Example 3A (NC-CNT)

Figure 3:
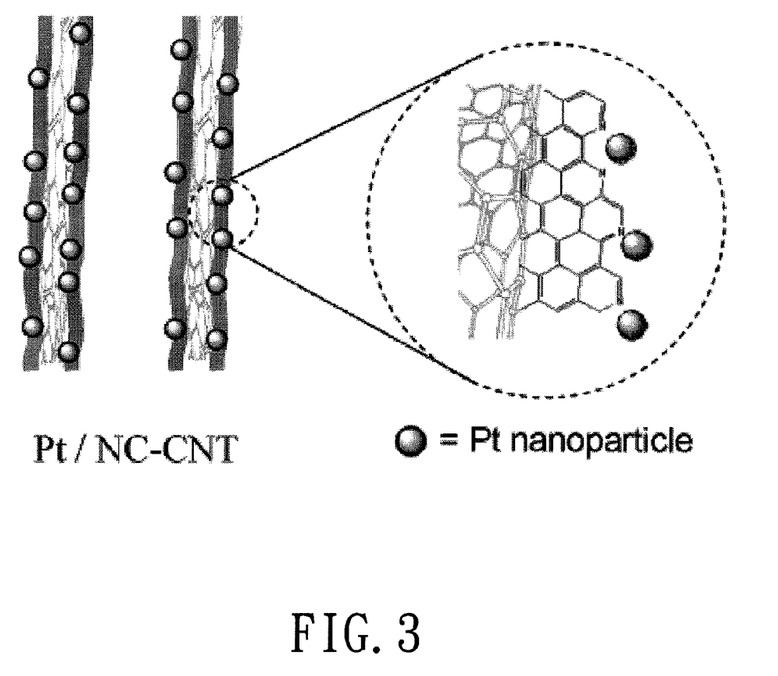
FIG. 3 is a schematic view illustrating Pt-carbon nanotubes (Pt/NC-CNT) composite catalyst of Example 3A.

An aqueous solution containing the aniline-dispersed CNT (0.050 g) of Example A1 was first stirred to obtain a CNT suspension. Then, aniline monomers (0.10) in 10 mL 0.5 M $H_2SO_4$ were added into the CNT suspension. The resulting mixture was stirred overnight at room temperature, and an aqueous solution containing an oxidant (($NH_4)_2S_2O_8$) was added with a molar ratio of 0.1:1. The aniline monomers attached to the CNT$ was polymerized in situ by chemical oxidation polymerization. The polymerization was carried out at room temperature for 24 h. The resulting hybrid carbon material was treated at temperature (800° C.) for carbonization in an argon gas flow oven for 3 h to form a nitrogen-doped carbon char layer surrounding carbon nanotubes (NC-CNTs). The structure of the NC-CNTs is shown schematically in FIG. 3.

Example 3B

The nanocomposites were synthesized by thermalsetting of phenolic resin on carbon nanotubes. A water-EtOH cosolvent (water:EtOH=1:1) containing 0.050 g of the phenolic resin-dispersed CNT was first stirred before the synthesis, and then different amount of phenolic resin (from 0.10 to 5.0 g) were added into the CNT suspension. The mixtures were subsequently stirred overnight at room temperature. The thermalsetting was carried out at 100° C. for 24 h. The hybrid carbon materials were treated at temperature (800° C.) for carbonization in an argon gas flow oven for 3 h to form a carbon char layer (nitrogen-free) surrounding carbon nanotubes.

Example IV

Loading of Pt Nanoparticles on Carbon Char Layer Surrounding Carbon Nanotubes

Examples 4A to 4C

In Example 4A, a solution containing 10.0 g of isopropyl alcohol, 8.0 g of deionized water, and 0.030 g of NC-CNT (Example 3A) was prepared to obtain a NC-CNT suspension. Benzylamine was added to the solution, and was stirred for 1 h. A solution of platinum precursor ($Pt^{+4}$) was added into the NC-CNT suspension and stirred for 3 h at room temperature. The mole ratio of benzyl amine to Pt was 10:1. Then, 0.226 g of citrate was added to the mixture (the mole ratio of citrate to Pt was 1:1). The temperature was increased to 115° C., the mixture was stirred for 30 min, and dried in vacuum at 70° C. overnight. Finally, the sample was heated at 400° C. in a quartz-tube furnace with flowing argon and hydrogen gas (1:1) for 4 h. In Example 4B, 0.03 g of NC-CNT in Example 4A was replaced by 0.03 g of the aniline-dispersed CNT. In Example 4C, 0.03 g of NC-CNT in Example 4A was replaced by 0.03g of the aniline-dispersed CNT, and no benzyl amine was used.

TABLE 1

| Example | Pt precursor (g) | CNT (g) | Benzyl-amine (g) | Average particle size (nm) |
|---|---|---|---|---|
| 4A | 0.02 | 0.03 g | 0.1 | 1.4 ± 0.4 |
| 4B | 0.02 | 0.03 g | 0.1 | 2.1 ± 0.5 |
| 4C | 0.02 | 0.03 g | 0 | 10 |
| Comparative Example* | | | | 2.4 ± 0.5 |

*Commercial E-TEK catalyst 20 wt % Pt/XC-72

Example V

Figure 5:
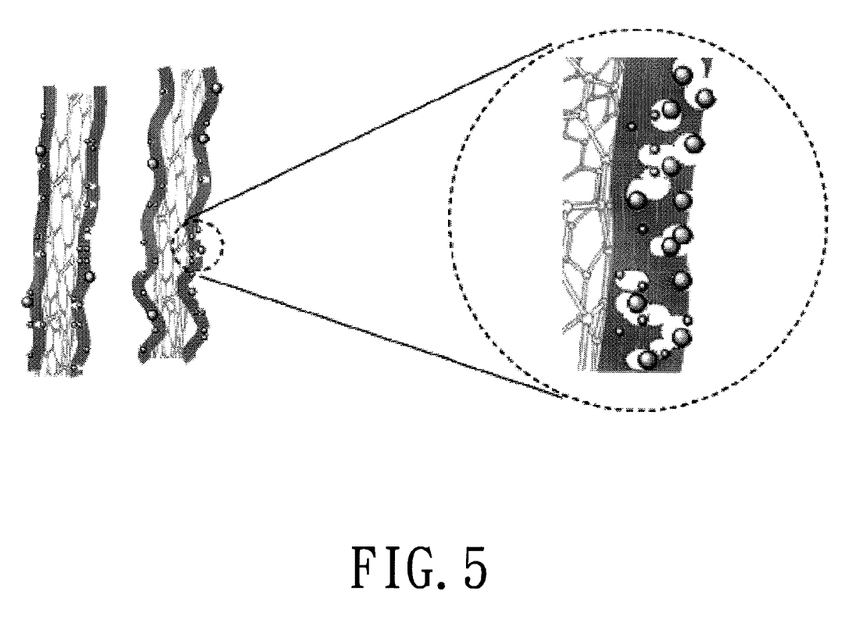
FIG. 5 is a schematic view illustrating Pt particles embedded in a porous structure of Pt-nanotube composite catalyst of Examples 5A to 5B.

Loading of Pt Nanoparticle Embedded in Porous Carbon Layer Surrounding Carbon Nanotubes Examples 5A & 5B In example 5A, 20.0 mL of an aqueous solution of isopropyl alcohol containing the aniline-dispersed CNT (0.050 g) of Example 1A was first stirred to obtain a CNT suspension. Then, aniline monomers in 10 mL 0.5 M $SO_4$ were added into the CNT suspension and were mixed with a solution containing an appropriate amount of blowing agent (such as, Urea, $CaCO_3$, benzoic acid, benzylamine, or 2,2',2",2'''-(Ethane-1, 2-diyldinitrilo)tetraacetic acid) and 1.6 mL of a Pt solution. The mixture was subsequently stirred 3 h at room temperature, and a solution of 0.50 M $H_2SO_4$ containing an oxidant (($NH_4)_2S_2O_8$) was added. Polymerization was carried out at room temperature for 20 h. The resulting hybrid carbon materials were treated at 650° C. in an argon gas flow oven (100 sccm) for 3 h to form a nitrogen dotted carbon char layer surrounding carbon nanotubes. Thereafter, an appropriate amount of sodium borohydride was added to the mixture (the molar ratio of sodium borohydride to Pt was 15:1), which was stirred for 6 h, and then filtered and dried in vacuum at 70° C. overnight. Finally, the sample was heated at 400° C. in a quartz-tube furnace with flowing argon gas for 2 h. The porous structure of the Pt-nanotube composite catalyst is shown in FIG. 5. In Example 5B, the experiment was carried out following the procedure of Example 5A except that the blowing agent was not used.

TABLE 2

| Example | Aniline (g) | Blowing agent (g) | Carbonization temperature (° C.) | Surface area ($m^2 g^{-1}$) | Particle size (nm) |
|---|---|---|---|---|---|
| 5A | 0.1 | 0.1 | 650 | 242 | 3.1 ± 1.1 |
| 5B | 0.1 | 0 | 650 | 120 | 1.6 ± 0.3 |

Example 5C

The nanocomposites were synthesized by thermalsetting of phenolic resin on carbon nanotubes. A water-EtOH cosolvent containing the phenolic resin-dispersed CNT (0.050 g) was first stirred before the synthesis. Phenolic resin was added into the CNT suspension, and mixed with a solution containing an appropriate amount of blowing agent (ex. Urea, $CaCO_3$, benzoic acid, benzylamine, and 2,2',2",2'''-(Ethane-1,2-diyldinitrilo)tetraacetic acid) and 1.6 mL of Pt solution. The mixture was subsequently stirred for 3 h at room temperature. The thermalsetting was carried out at 100° C. for 20 h. The hybrid carbon material was treated at a temperature (500-800° C.) in an argon gas flow oven (100 sccm) for 3 h to form a char layer surrounding carbon nanotubes. No nitrogen is contained in the char layer.

Electrocatalytic measurement
Single Fuel Cell Test (I) for Example 2A

Figure 8A:
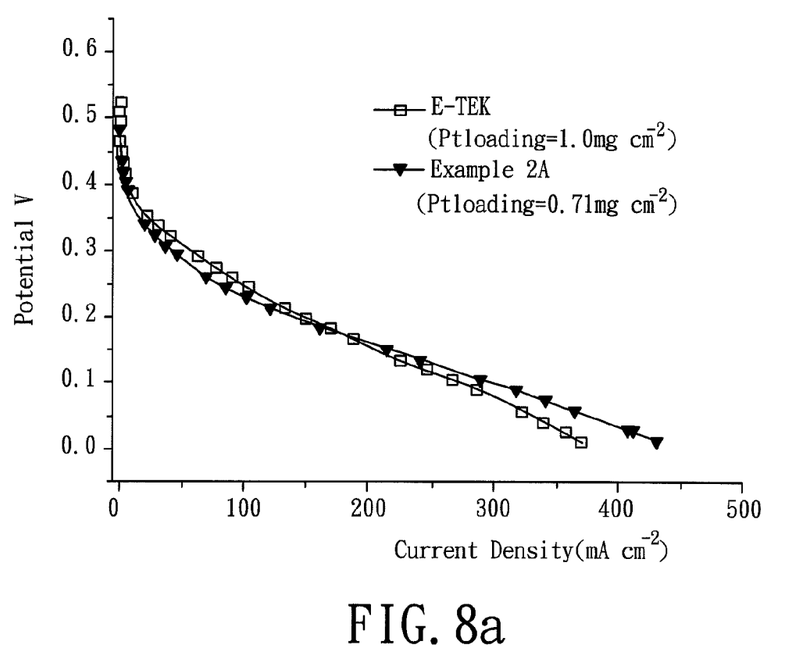
FIGS. 8*a* & 8*b* respectively show I-V curves and electrochemical performance for Pt/CNT of Example 2A and E-TEK catalysts as DMFC cathodes at 70° C., Fuel feed: 2.0 M $CH_3OH$ 2.0 mL min$^{-1}$; oxygen feed: 200 sccm.
Figure 8B:
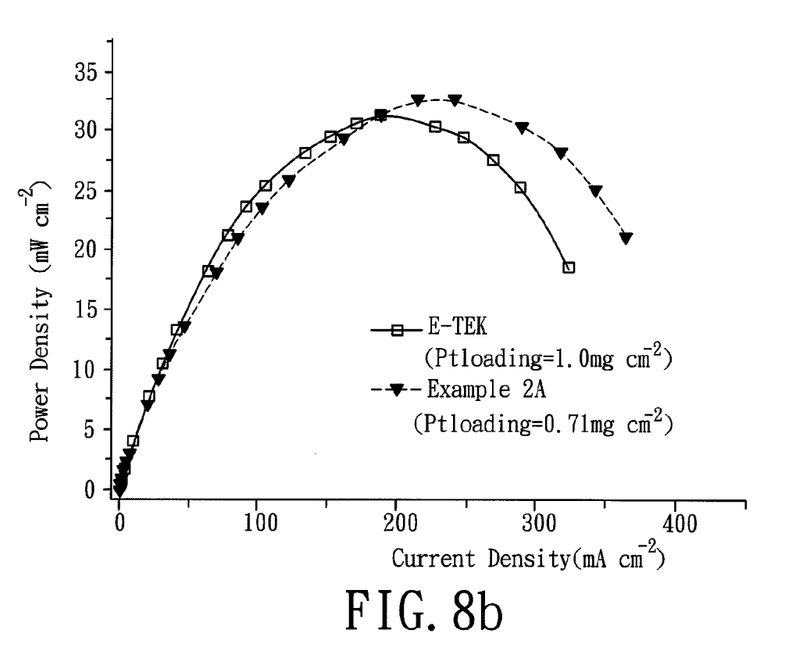

To probe the benefits of highly dispersed Pt catalyst, both Example 2A and E-TEK 20% Pt/C (commercial catalyst) were used as the cathode material. In each fuel cell test, E-TEK 20% Pt/C was used as anode, Pt loading was 1.0 mg cm$^{-2}$, and their polarization behavior (see FIG. 8$a$) and power density curve (see FIG. 8$b$) of the single DMFC at 70° C. were compared.

The single fuel cell test was evaluated using a unit cell with an active area of 5 cm$^2$ fed with methanol at the anode for a flow rate of 2 ml min$^{-1}$ and oxygen at the cathode for a rate of 200 ml min$^{-1}$. The membrane electrode assemblies for the single cell test were fabricated as follows. Catalyst ink was prepared by mixing Pt/C catalyst powder with water (2 ml for 1 g of electrocatalyst), and then adding iso-propanol (20 ml for 1 g of electrocatalyst) to avoid any ignition.

5% Nafion dispersion (Dupont) was added (0.8 g solid Nafion for 1 g of catalyst) to the catalyst slurry. Catalyst coating on gas diffusion layer (50 wt % wet-proofing carbon paper, Toray) with 5 cm$^2$ active area was fabricated by brushing Pt/C catalyst ink. The catalyst-coated GDLs were hot-pressed with Nafion-117 membrane (Du Pont) at 140° C. under 30 kg cm$^{-2}$ of pressure.

TABLE 3

| Catalyst | Pt loading (mg cm$^{-2}$) | Power density (mW cm$^{-2}$) | Mass activity (W g$^{-1}$) |
|---|---|---|---|
| Example 2A | 0.71 | 32.6 | 45.9 |
| E-TEK* | 1.0 | 31.4 | 31.4 |

*Commercial E-TEK catalyst 20 wt % Pt/XC-72

Single Fuel Cell Test (II) for Examples 4A and 4B

To probe the benefits of high nitrogen-contained carbon char on CNT composite, Examples 4A, 4B and E-TEK 20% Pt/C were used as the cathode material. In each fuel cell test, E-TEK 20% Pt/C was used as anode, and the Pt loading was 1.0 mg cm$^{-2}$. Power density curves (FIG. 9) of the single DMFC at 70° C. were compared.

TABLE 4

| Example | Particle size$^{(a)}$ (nm) | Mass activity (mW mg$^{-1}$ Pt) |
|---|---|---|
| 4A | 1.4 ± 0.4 | 111 |
| 4B | 2.1 ± 0.5 | 93 |
| Comparative Example* | 2.4 ± 0.5 | 78 |

*Commercial E-TEK catalyst 20 wt % Pt/XC-72

Methanol Oxidation Activity Test for Example 5A & 5B

Figure 10:
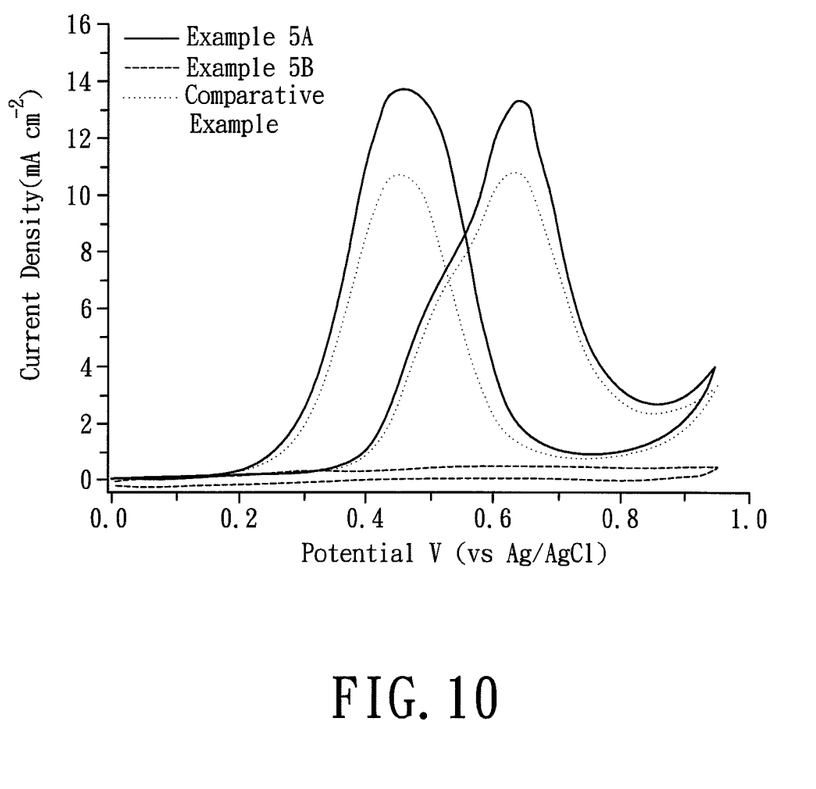
FIG. 10 shows the CV curves of Example 5A, Example 5B and E-TEK in 1.0 M MeOH+0.5 M $H_2SO_{4\ (aq)}$ at a scan rate of 20 mV s$^{-1}$.

Typical voltammetric curves for methanol oxidation over Pt@NC-CNT catalysts of Example 5A and Example 5B in N$_2$ saturated 0.5 M H$_2$SO$_4$ and 1.0 M MeOH aqueous solution is shown in FIG. 10.

A CHI-608A potentiostat/galvanostat and a conventional three-electrode test cell was used for electrochemical measurement. GC disk electrode (5 mm diameter, Pine) served as the substrate for the supported catalyst. An aliquot of catalyst suspension was transferred onto the carbon substrate, leading to a catalyst loading of 50.9 µg catalyst cm$^{-2}$ for Pt@NC-CNT and E-TEK. The CV test was performed on the working electrode by cycling the voltage between −0.25 and 0.95 V versus Ag/AgCl electrode in 0.1 M HClO$_4$ solution. Electrooxidation of MeOH was carried out with an electrolyte of 0.5 M H$_2$SO$_4$ and 1.0 M MeOH between 0 and 0.95 V at room temperature. The scan rate was 20 mV s$^{-1}$.

TABLE 5

| Example | Pt content (%) | I$_{max}$ (mA cm$^{-2}$) |
|---|---|---|
| 5A | 20.4% | 13.2 |
| 5B | 18.8% | 0.51 |
| Comparative Example* | 20.0% | 10.8 |

*Commercial E-TEK catalyst 20 wt % Pt/XC-72

Figure 1:
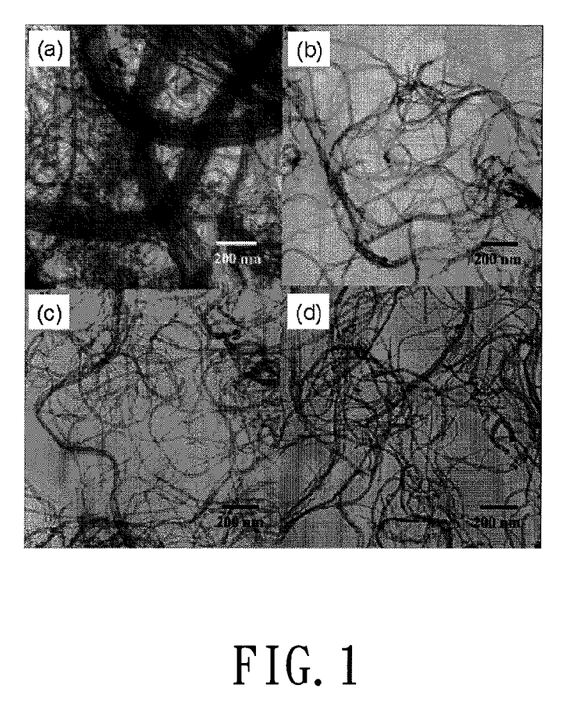
FIGS. 1*a* to 1*d* show TEM images of the pristine CNTs and the aniline-dispersed CNTs of Examples 1A to 1C.
Figure 2:
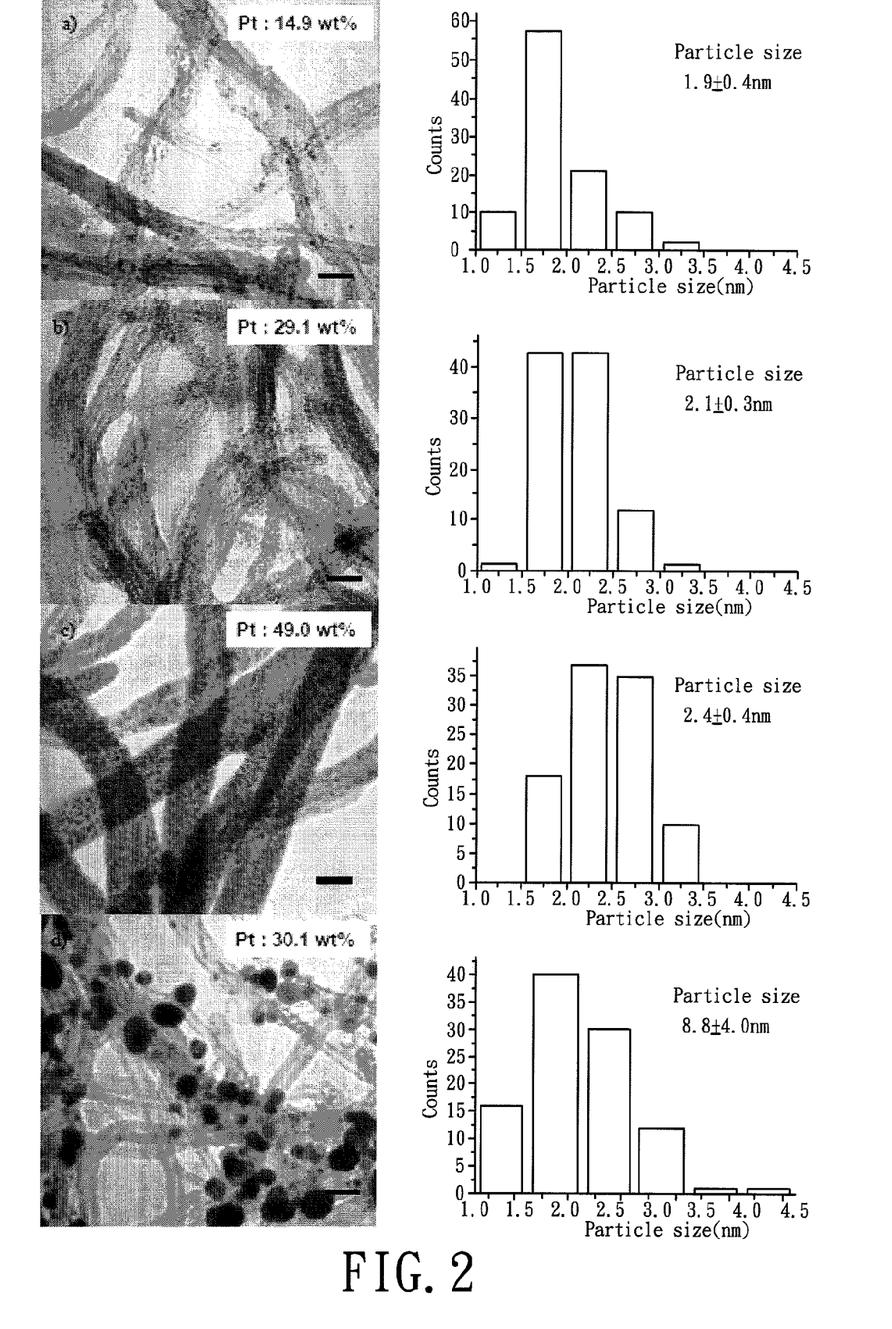
FIGS. 2*a* to 2*c* show TEM images for Pt-carbon nanotubes composite catalysts of Examples 2A to 2C.
FIG. 2*d* shows a TEM image of a comparative example without aniline.

Referring FIGS. 1$a$-1$d$, the pristine CNTs exist mainly in the form of entangled bundles, with a diameter of 100-200 nm (FIG. 1$a$). When 0.5% aniline was added, the CNT bundles were separated into individual nanotubes accompanied by small-diameter bundles of less than 50 nm, as shown in FIG. 2$b$. As the addition of aniline was increased from 0.5% to 2.5% (FIG. 2$c$), the proportion of individual CNTs in the IPA/water solution increased remarkably. However, further addition of aniline to 10% (FIG. 2$d$) changed the status of dispersion to a lesser extent. It is evident that aniline acts as a very efficient dispersing agent to debundle CNTs at a very low concentration of 0.5% in IPA/water solution.

Referring to FIGS. 2$a$ to 2$c$, the Pt/CNTs composite catalysts prepared in Examples 2A to 2C were investigated by TEM. The Pt contents for the examples were found to be 14.9%, 29.1%, and 49.0%, respectively. The content of Pt contained in each Pt/CNT composite was obtained by thermogravimetric analysis (TGA). Pt particles are anchored on the CNTs with uniform dispersion and small particle size distribution in the examples. The average particle sizes of Pt are 1.9±0.4, 2.1±0.3, and 2.4±0.4 nm for 14.9%, 29.1% and 49.0% Pt/CNT composite catalysts, respectively. FIG. 2$d$ shows comparative example without aniline, which has particle size larger than those shown in FIGS. 2$a$ to 2$c$.

Figure 4:
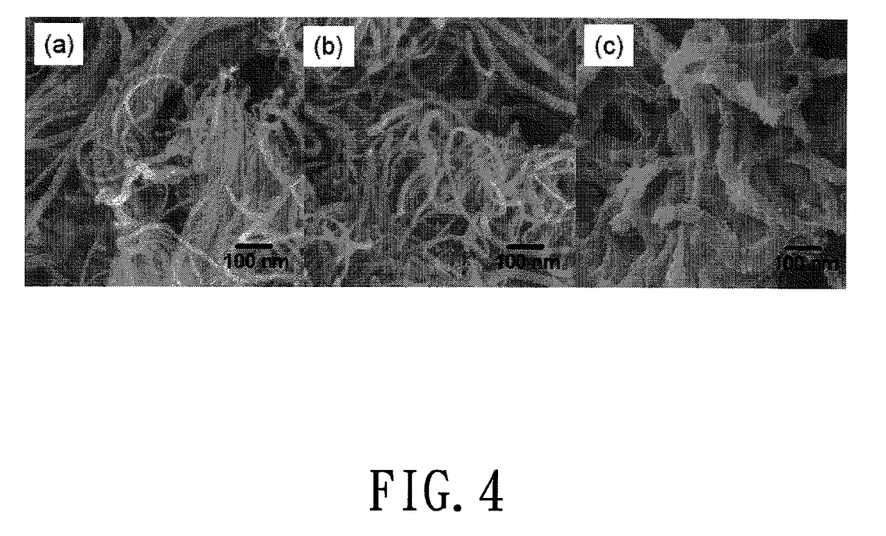
FIGS. 4*a* to 4*c* show SEM images for pristine CNT, aniline-dispersed CNT, and N-doped carbon char-containing carbon nanotubes (NC-CNT) composite catalyst of Example 3A.

Referring to FIG. 4$a$, the pristine CNTs exist in the form of large bundles with diameter of 100 nm or larger. Under the influence of aniline, the particle size of the CNT (Example 1A) decreases to 20-30 nm (FIG. 4$b$). After the aniline adsorbed onto the CNT is polymerized and carbonized, the diameter of the NC-CNT (Example 3A) becomes large (50 nm, FIG. 2C). This demonstrates that the polyaniline is uniformly coated on the CNT to produce a core-shell morphology. An analysis using nitrogen adsorption-desorption isotherm indicates that the introduction of the N-doped carbon char layer on the CNT in Example 3A increases the surface roughness of the CNT.

An X-ray photoelectron spectroscopy analysis was carried out to estimate the amount of nitrogen in the surface layer of the NC-CNT of Example 3A. The percentage of N/C on the surface layer of the NC-CNT was measured to be 13.4%. The N/C percentage determined by EDS analysis is 14%. Compared the N/C percentages obtained by methods in the prior art that employ nitrogen, ammonia, etc., to dope nitrogen on CNTs, the method of the present invention using aniline as a dispersant, provides a relatively higher percentage of N/C on CNTs.

Figure 6:
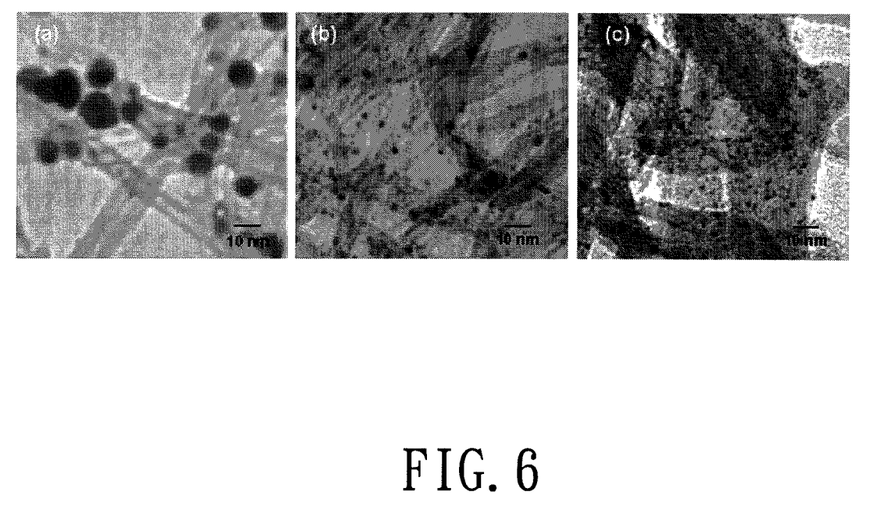
FIGS. 6*a* to 6C show TEM images of (a) Pt/CNT of Example 4C (without benzylamine), (b) Pt/CNT of Example 4B (with benzylamine), and (c) Pt/NC-CNT of Example 4A (with benzylamine)

Referring to FIGS. 6$a$ to 6$c$ show TEM images of the composite catalysts of Examples 4A to 4C. The particle sizes listed in Table 2 show that Example 4c, which does not utilize benzylamine, has an average particle size larger than that of Examples 4B and 4A. With the use of benzylamine, the particle sizes of the Pt of Examples 4B and 4A are small and uniform compared to that of the commercial E-TEK catalyst. The results indicate that benzylamine can be used as a stabilizer to effectively stabilizes small Pt nanoparticles (1.4±0.4 nm) on the aniline-dispersed CNT and the NC-CNT.

Figure 7:
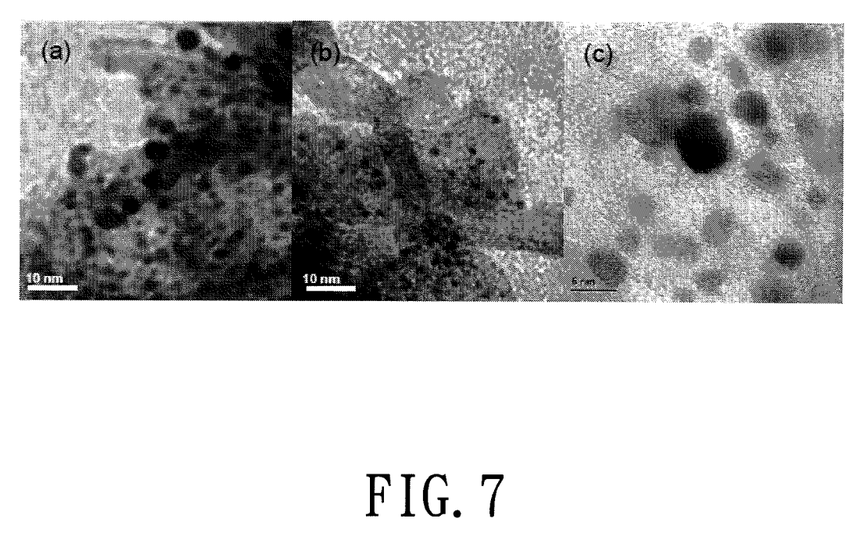
FIGS. 7*a* to 7*c* show TEM images of (a) Pt@NC-CNT of Example 5A (with blowing agent), (b) Pt@NC-CNT of Example 5B (without blowing agent), and HR-TEM image of (c) Pt@NC-CNT Example 5A (with blowing agent).

Referring to FIGS. 7a to 7c, SEM images show that the particle sizes and distribution of the Pt catalyst on different carbon supports were measured by TEM. Example 5A (FIG. 7a) and Example 5B (FIG. 7b) particles are all small (2.8±1.3 and 1.6±0.3 nm, respectively) and uniform. This means that the nitrogen species of polyaniline or dotted in the carbon layer can effectively stabilize $Pt^{4+}/Pt^0$, and favor the formation of small Pt nanoparticles. FIG. 7c displays a typical high resolution TEM (HRTEM) image of the Example 5A. The Pt nanoparticles are found to be surrounded by microporous graphite layers, which illustrates that the Pt nanoparticles are covered by a carbon char layer.

FIGS. 8a and 8b show the results of the single fuel cell test. (I) and indicate that, compared with the E-TEK catalyst, an improved polarization behavior was observed for the Pt-CNT catalyst of Example 2A in the higher current density region.

Figure 9:
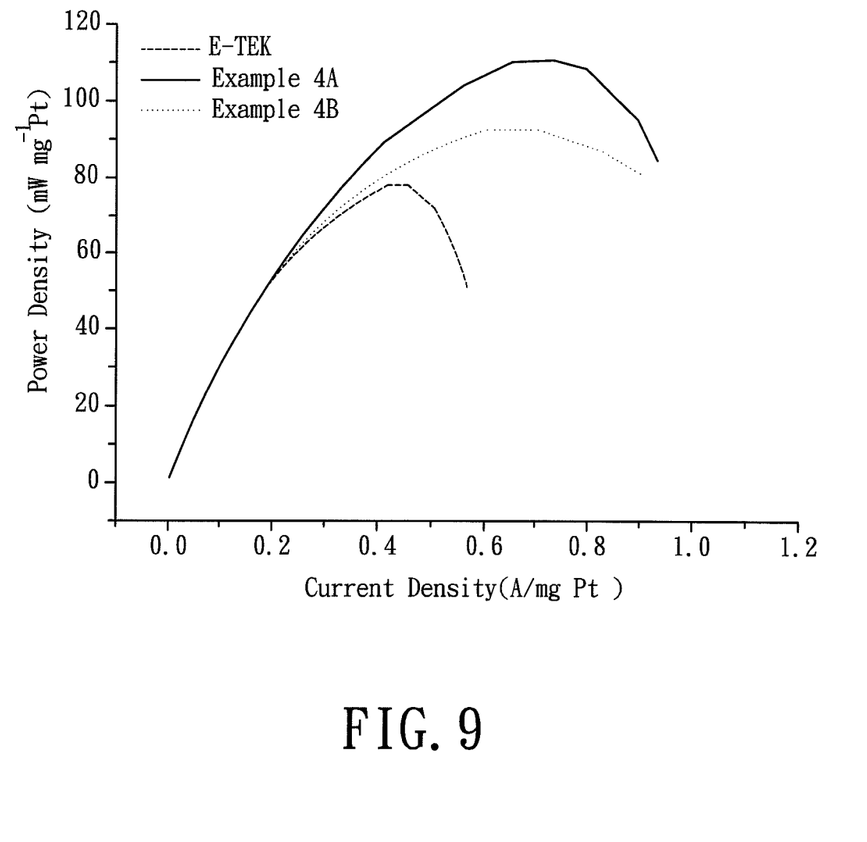
FIG. 9 shows electrochemical performance for Pt/CNT of Example 4B, Pt/NC-CNT of Example 9A and E-TEK.

FIG. 9 shows the results of the single fuel cell test (II) and indicates that, compared with the E-TEK, the NC-CNT-based electrode has an improved polarization behavior and an improved mass activity of about 40% higher than that of the E-TEK. Due to the high amount of nitrogen doped on the CNT, a strong interaction of nitrogen with the Pt particles is achieved and is evidenced by the binding energy obviously observed at 399.5 eV.

FIG. 10 shows the voltammetric curves in $N_2$ saturated 0.5 M $H_2SO_4$ and 1.0 M MeOH aqueous solution. The maximum current densities during methanol oxidation were measured from voltammetric curves for Example 5A (13.2 mA $cm^{-2}$), Example 5B (0.51 mA $cm^{-2}$) and E-TEK electrode (10.8 mA $cm^{-2}$). Example 5A shows a 25 times higher value than Example 5B, and a 1.2 times higher value than E-TEK in catalytic activity because the surface of the Pt nanoparticles are exposed. This demonstrates that the function of the blowing agent used for preparing Example 5A in this novel synthesis technique is of paramount importance to the catalytic ability of the methanol oxidation reaction.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method of preparing a carbonized nanotube composite for the preparation of a catalyst usable in a chemical reaction, comprising; debundling carbon nanotubes; loading a carbon-containing polymeric material onto the surfaces of the nanotubes that have been debundled; and carbonizing in situ the carbon-containing polymeric material on the carbon nanotubes to form carbon char layers surrounding the surfaces of the carbon nanotubes.

2. The method of claim 1, wherein the carbon nanotubes are debundled by treating the carbon nanotubes with an aqueous solution containing aniline.

3. The method of claim 2, wherein the aqueous solution further contains water and a polar organic solvent.

4. The method of claim 3, wherein the carbon nanotubes is treated with the aqueous solution by sonication without application of heat.

5. The method of claim 3, wherein the polar organic solvent is isopropanol.

6. The method of claim 1, wherein the carbon-containing polymeric material includes polyaniline.

7. A method for preparing a metal-carbon nanotube composite catalyst for a chemical reaction, comprising; debundling carbon nanotubes; loading a carbon-containing polymeric material onto the surfaces of the nanotubes that have teen debundled; carbonizing in situ the carbon-containing polymeric material on the carbon nanotubes to form carbon char layers surrounding the surfaces of the carbon nanotubes; and loading metal-based catalyst particles on the carbon nanotubes.

8. The method of claim 7, wherein the metal-based catalyst particles include a metal species selected from the group consisting of Pt, Pd, Co, Au, Mn, Ni, Fe, and Cr.

9. The method of claim 7, wherein the metal-based catalyst particles include platinum particles.

10. The method of claim 7, wherein the carbon nanotubes are debundled by treating the carbon nanotubes with an aqueous solution containing aniline.

11. The method of claim 10, wherein the aqueous solution further contains water and a polar organic solvent.

12. The method of claim 11, wherein the polar organic solvent is isopropanol, and the concentration of aniline in the aqueous solution is 0.5%.

13. The method of claim 7, wherein the carbon-containing polymeric material includes polyaniline.

14. The method of claim 13, wherein the polyaniline is loaded onto the surfaces of the carbon nanotubes by attaching aniline monomers on the carbon nanotubes followed by in situ polymerization of the aniline monomers, and wherein the polyaniline is carbonized to form the carbon char layers containing nitrogen.

15. The method of claim 14, wherein the polyaniline is carbonized at a temperature ranging from 500.degree. C. to 900.degree. C.

16. The method of claim 14, wherein the amount of nitrogen in the carbon char layers is about 14%.

17. The method of claim 7, wherein the metal catalyst particles are loaded onto the debundled carbon nanotubes after the step of carbonizing to form the carbon char layers.

18. The method of claim 17, wherein the metal catalyst particles include platinum nanoparticles, and the platinum nanoparticles are loaded onto the carbon nanotubes in the presence of benzyl amine.

19. The method of claim 7, wherein the metal catalyst particles are loaded onto the debundled carbon nanotubes before the step of polymerizing the aniline monomers into polyaniline.

20. The method of claim 19, wherein the aniline monomers are polymerized in situ to form a porous structure of polyaniline using a blowing agent so that the carbon char layers are porous and the metal catalyst particles are embedded in the porous structure of the carbon char layers.

* * * * *